Aug. 19, 1924.
S. LANDA
1,505,522
MULTIFOLD PATTERN MAKER
Filed Oct. 7, 1922  2 Sheets-Sheet 1
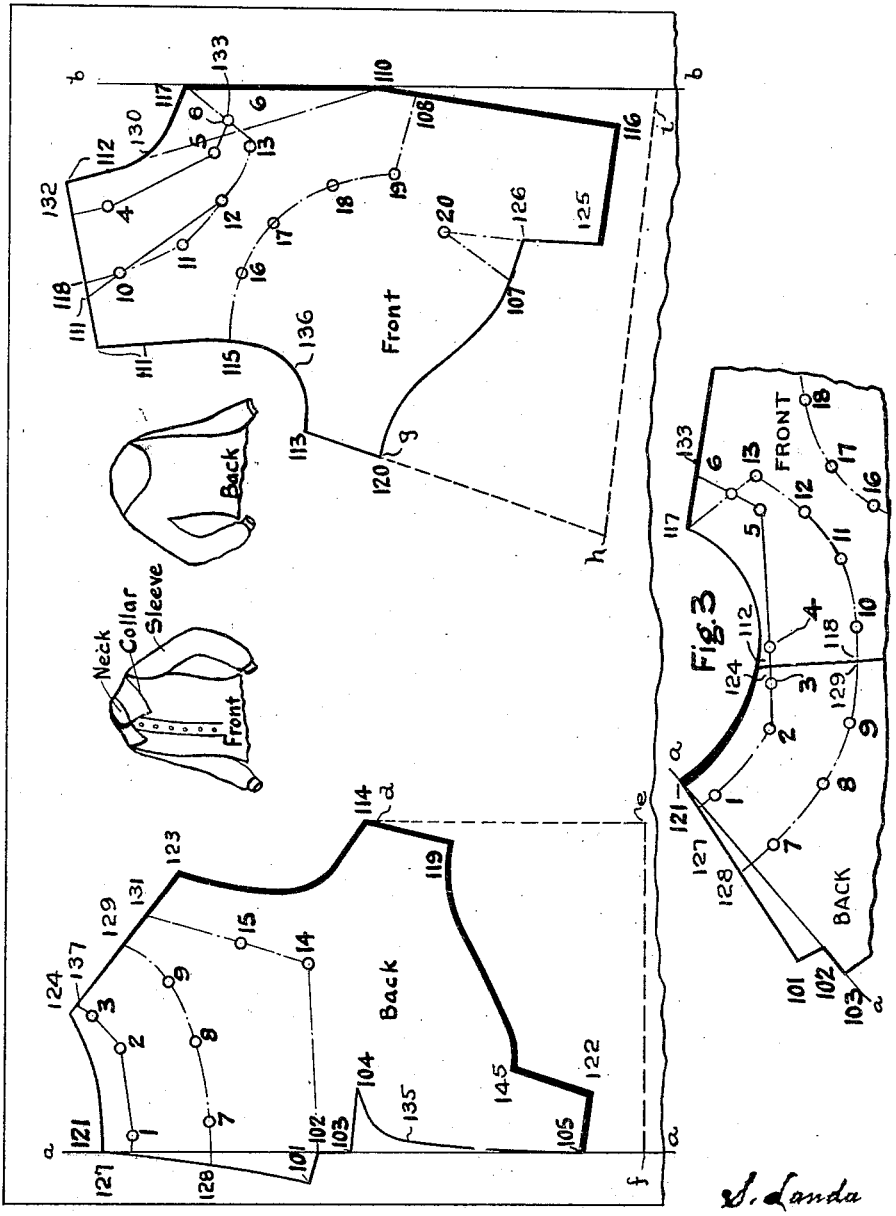
INVENTOR
S. Landa
BY J. O. Fowler
ATTORNEY

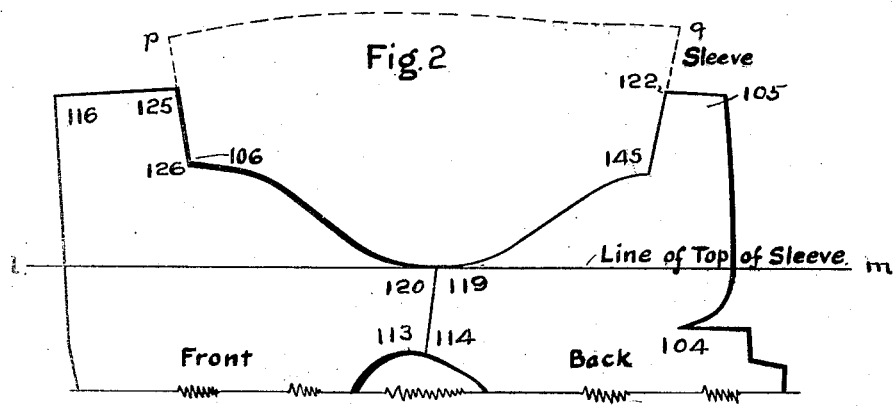
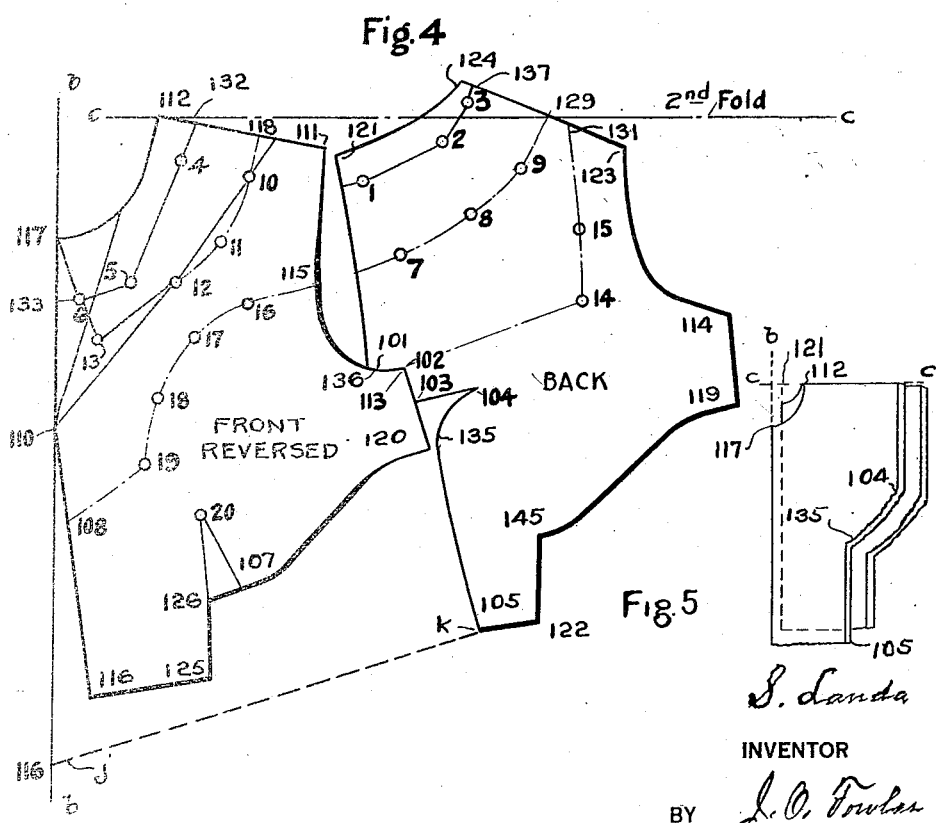

Patented Aug. 19, 1924.

1,505,522

UNITED STATES PATENT OFFICE.

SARAW LANDA, OF NEW YORK, N. Y.

MULTIFOLD-PATTERN MAKER.

Application filed October 7, 1922. Serial No. 593,118.

*To all whom it may concern:*

Be it known that I, SARAW LANDA, a citizen of Russia, and resident of New York, in the county of New York and State of New York, have invented a certain new and useful Multifold-Pattern Maker, of which the following is a specification, the same being a full, clear, and exact description of the invention, such as will enable others skilled in the art to which it appertains to make and use the same.

This invention relates to devices employed in the manufacture of garments, and in particular to a multiplex pattern producer wherein is embodied not only the various patterns of the several parts of an article of wear, but also additional patterns of other and different garments.

One object of the invention is to provide what I term pattern charts of particular and varied form, the contours of which shall form the boundary lines of some parts of a pattern for an article of wear.

Another object of the invention is to provide pattern charts equipped with guiding lines having location points which preferably may be perforated at intervals, which lines shall run across said charts and form parts of the boundary lines of some other parts of patterns.

An additional object of the invention is to provide self-indicating devices whereby upon joining different but corresponding portions of the charts in several ways, different pattern lines will be denoted.

Another object of the invention is to provide my pattern charts with positioning characters which will enable the operator to correctly apply the pattern charts to the goods to be cut.

A still further object of the invention is the provision of display sheets showing the several manners in which the pattern charts may be employed in order to furnish patterns of the several parts of a dress or other garment.

Another object of the invention is the provision of pattern charts which may be properly joined on a display sheet, or else may be cut out or otherwise separated from said sheet and joined manually at will.

With the foregoing objects of the invention in view, and other objects and purposes which will be described below, the invention consists in the construction, arrangement, combination and operation of parts hereinafter set forth.

In the drawings, illustrative of one embodiment of the invention, which accompany and form a part of this specification—

Figure 1 represents a plan view of a display sheet showing two pattern charts and indicating the way in which articles of wear should be cut from the goods;

Figure 2 is a plan view of a display sheet showing two pattern charts joined together to form the pattern of a sleeve;

Figure 3 is a plan view of a display sheet showing two pattern charts joined together in a different way to form the patterns of the neck and collar of a dress, Figure 4 illustrates the manner in which my charts may be positioned in order to cut out a butterfly waist; and Figure 5 is a perspective view showing such a waist partially cut out.

Referring more in detail to the drawings, where a few examples of the operation of my pattern charts are shown, the pattern chart marked "Back" in Figure 1 may be used by following the outline thereof to cut out the back of a waist, the goods being folded in the usual manner. In this case the chart must be held so that a vertical line $a$, $a$ will pass through the positioning characters 102 and 103. The chart marked "Front" may be employed in a similar manner to cut out the front of the waist, care being taken that the positioning characters 117 and 110 shall lie in a vertical line $b$, $b$ as shown.

The display sheet shown in Figure 1 indicates a finished garment and serves as a guide in cutting out and positioning the various portions of the same. The broken lines $f$, $e$; $h$, $i$; $p$, $q$ and $j$, $k$ (Figs. 1, 2 and 4) indicate that the material may be cut at any length desired which lengths may be varied at will, while the broken lines $g$, $h$ and $d$, $e$ denote in which direction the respective portions of the garment may be extended.

I preferably employ positioning marks, as for example 124, 129 and 112, 118 and also 120, 113 and 119, 114 and also 136, 113, 120 and 101, 102, 103 to serve as guides in joining the irregular boundary edges of the charts together in different manners in abutting relation edgewise for cutting out various portions of garments, the said various patterns being formed either by said boundary edges or by the said edges and lines running across the face of the charts, or also in some cases by following the said lines alone.

Other portions of garments besides the front and back parts of a waist as described may be cut out by fitting my charts to each other in different positions according to the following directions. For a sleeve, join the charts so that the positioning lines 120 and 113 will coincide with lines 119, 114 respectively. Fold the material on the line $l, m$ and cut out the sleeve on the lines 125, 126, 120, 119, 145 and 122. For a neck join the charts so that the line 124 and 129 will coincide with line 112, 118 and cut on the line 121, 124, 112 and 117. To form a square neck join the charts as before and cut on line 121, 127, orifices 1, 2, 3, 4, 5, 6 and line 133 (the end of line 137—near the orifice 3—coinciding with the end of the line 132—near the orifice 4—shown in the separate views of the front and back charts in Figure 1). For a collar join the charts as before and cut on line 128, orifices 7, 8, 9, (near line 129) 10 (near line 118) 11, 12, 13, 6 and line 117. The charts being assembled in the same position a sailor collar may be cut on the line 102, orifices 14, 15, line 131, orifices 10, 12, to line 110 and then backward at an angle to line 130.

A yoke may be cut out on the line of the front chart running from line 115 to orifices 16, 17, 18, 19 to the line 108. The dart for a tight fitting lining may be cut out on the line 107 to orifice 20 and back to line 126 also on the front chart. To cut out a butterfly waist join the chart as shown in Figure 4 so that the positioning lines 136, 113 and 120 of the front chart reversed will coincide and form an angle with the lines 101, 102 and 103 of the back chart the points 110 and 117 lying on the line $b, b$. Then fold the material on the line $b, b$ and fold again on line $c, c$, after which cut through the four thicknesses from point 104 on a line curved around curved portion 135 to point 105. For the front neck cut the upper two layers from line 112 to line 117. Then place the charts in position on the lower two layers so that one will lie over the other and for the back neck, after it is seen that the points 124 and 112 coincide with each other and that the side line 121—101 of the back chart coincides with the side line 117—110 of the reversed front chart, cut out on the line 124 to 121.

The pattern charts are obviously made for different sizes of articles of wear and may be properly joined in different manners on display sheets to furnish patterns for the several parts of a garment, or else they may be cut out or otherwise separate from said sheets and joined manually at will.

I wish it to be understood that I do not desire to be limited to the particular use or the exact details of construction shown and described, for obvious modifications will occur to persons skilled in the art.

What I claim as my invention is:—

1. In an article of the class described two pattern charts each having a contour to form, when used by itself, a boundary line of the pattern of a portion of an article of wear, and the two adapted, when joined in predetermined abutting relation, to jointly form a boundary line of the pattern of another part of the garment.

2. In an article of the class described, two pattern charts, each having its boundary edge shaped in the outline of portions of a plurality of garment parts whereby predetermined portions respectively of the boundary edge of one chart may be fitted in abutting relation with a co-operating portion of the edge of the other chart to form successively the outline of the several parts of a garment.

3. In an article of the class described, two pattern charts, each having its boundary edge shaped in the outline of portions of a plurality of garment parts, there being boundary lines comprising the outline of other portions of said garment parts described across the faces of each chart, whereby predetermined portions respectively of the boundary edge of one chart may be fitted in abutting relation with a co-operating portion of the edge of the other chart to form successively the outline of certain parts of a garment, and whereby the two charts may be successively fitted together so that a portion of one edge of one chart and one of the boundary lines of the other chart shall cooperate to form the outline of another part of the garment.

Signed at New York, in the county of New York and State of New York, this 19th day of September A. D., 1922.

SARAW LANDA.